(12) United States Patent
Sekimoto

(10) Patent No.: US 12,032,349 B2
(45) Date of Patent: Jul. 9, 2024

(54) CONTROLLER

(71) Applicant: OMRON Corporation, Kyoto (JP)

(72) Inventor: Hidehiko Sekimoto, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 12 days.

(21) Appl. No.: 17/614,722

(22) PCT Filed: Feb. 21, 2020

(86) PCT No.: PCT/JP2020/007162
§ 371 (c)(1),
(2) Date: Nov. 29, 2021

(87) PCT Pub. No.: WO2020/255486
PCT Pub. Date: Dec. 24, 2020

(65) Prior Publication Data
US 2022/0221833 A1 Jul. 14, 2022

(30) Foreign Application Priority Data
Jun. 20, 2019 (JP) .................................. 2019-114346

(51) Int. Cl.
*G05B 19/05* (2006.01)
(52) U.S. Cl.
CPC ......... *G05B 19/056* (2013.01); *G05B 19/058* (2013.01)
(58) Field of Classification Search
CPC .... G05B 19/056; G05B 19/058; G05B 19/05; Y02P 90/02
See application file for complete search history.

(56) References Cited

U.S. PATENT DOCUMENTS 5,636,124 A * 6/1997 Rischar ............... G05B 19/042
713/1
2003/0236577 A1* 12/2003 Clinton ..................... G06F 8/51
700/9
(Continued)

FOREIGN PATENT DOCUMENTS

CN 109491307 A 3/2019
CN 109491324 A 3/2019
(Continued)

OTHER PUBLICATIONS

International Search Report issued in Intl. Appln. No. PCT/JP2020/007162 dated Apr. 14, 2020. English translation provided.
(Continued)

*Primary Examiner* — Christopher W Carter
(74) *Attorney, Agent, or Firm* — ROSSI, KIMMS & McDOWELL LLP

(57) ABSTRACT

A control device includes a program in a first execution format in which an overall program is executed per execution and a program in a second execution format in which parts of the program are sequentially executed. The device includes a processor that calculates, based on execution of the program in the second execution format, a second command value for controlling a control target in accordance with an intermediate code generated by an interpreter and calculates the second command value for controlling the same control target in response to the execution of the program in the first execution format, and a permitter that permits, in response to overlap between the execution times of the two programs, execution of one of the two programs accessing a second processor earlier than the other.

4 Claims, 6 Drawing Sheets

(56) References Cited

U.S. PATENT DOCUMENTS

| | | |
|---|---|---|
| 2011/0055841 A1 | 3/2011 | Senno |
| 2012/0239172 A1* | 9/2012 | Nishiyama ............ G05B 19/05 700/86 |
| 2014/0005835 A1 | 1/2014 | Nishiyama |
| 2019/0049925 A1* | 2/2019 | Shimamura ........ G05B 19/4145 |
| 2019/0079497 A1 | 3/2019 | Yamamoto et al. |
| 2019/0079499 A1 | 3/2019 | Yamamoto et al. |
| 2019/0079500 A1 | 3/2019 | Nakano et al. |
| 2019/0095247 A1* | 3/2019 | Shimamura ........ G05B 19/4145 |
| 2019/0272197 A1* | 9/2019 | Adachi ................ G06F 9/4818 |

FOREIGN PATENT DOCUMENTS

| | | |
|---|---|---|
| JP | H11272462 A | 10/1999 |
| JP | 2012194662 A | 10/2012 |
| JP | 2019036043 A | 3/2019 |
| WO | 2009157136 A1 | 12/2009 |

OTHER PUBLICATIONS

Written Opinion issued in Intl. Appln. No. PCT/JP2020/007162 dated Apr. 14, 2020. English translation provided.
Extended European search report issued in European Appln. No. 20826012.5 dated Dec. 23, 2022.
Office Action issued in Chinese Appln. No. 202080038653.2 mailed Feb. 20, 2024. English translation provided.

\* cited by examiner

CONTROLLER

FIELD

The present invention relates to a control device for controlling one or more control targets.

BACKGROUND

Factory automation (FA) techniques using control devices such as programmable logic controllers (PLCs) have been widespread at various production sites. Such a control device may indirectly control, in addition to directly controlling a control target, a control target through another device by providing a control command to the other device. Control systems including multiple dedicated devices are to integrate such devices into fewer control devices. For example, with the technique described in Patent Literature 1, a central processing unit (CPU) module in a PLC executes a motion computation program and a user program in synchronization.

Patent Literature 2 describes a technique for performing control computations in accordance with multiple programs in different execution formats with a single control device. For example, this technique computes command values for a program in one format in which the program is entirely executed per control cycle and for a program in another format in which parts of the program are sequentially executed in accordance with intermediate codes generated through interpretation of each part of the program. The computed command values are output together per control cycle.

CITATION LIST

Patent Literature

Patent Literature 1: Japanese Unexamined Patent Application Publication No. 2012-194662
Patent Literature 2: Japanese Unexamined Patent Application Publication No. 2019-36043

SUMMARY

Technical Problem

With a known technique, a common control target (e.g., a robot) may be controlled by one control device such as a PLC that executes a program in a format in which the program is entirely executed per control cycle and by another control device that executes a program in a format in which parts of the program are sequentially executed in accordance with intermediate codes generated through interpretation of each part of the program. However, the user is to manage which one of the control devices is controlling the control target and thus cannot build such a control system easily. Under insufficient management by the user, the control target may be controlled by both the control devices at a time and may behave in an unexpected manner.

Also, the known technique is not directed to controlling a control target commonly with different programs using a single control device that performs control computations in accordance with multiple programs in different execution formats. Such a control system is to be improved to reduce the load for building the system or increase safety in the control over a control target.

In response to the above issue, one or more aspects of the present invention are directed to a technique for easy building of a system that allows appropriate control over a control target.

Solution to Problem

In one or more aspects of the present invention, a single control device can execute multiple programs in different execution formats. In response to overlap between the execution times of different programs, the control device performs determination to execute one of the programs at a time. This structure allows determination of the execution states of different programs in real time and allows appropriate control over a control target.

More specifically, a control device according to an aspect of the present invention includes a first program in a first execution format in which an overall program is executed per execution and a second program in a second execution format in which parts of the second program are sequentially executed. The device includes a first processor that executes the first program in the first execution format per predetermined control cycle to calculate a first command value for controlling a first control target, a second processor that executes the second program in the second execution format to calculate a second command value for controlling a second control target per predetermined control cycle in accordance with an intermediate code generated by an interpreter interpreting at least a part of the second program in the second execution format and calculates the second command value for controlling the second control target in response to the first processor executing the first program in the first execution format, an output unit that outputs the first command value and the second command value per predetermined control cycle, and a permitter that permits, in response to overlap between a time to execute the first program in the first execution format and a time to execute the second program in the second execution format for controlling the second control target, execution of one of the first program or the second program accessing the second processor earlier than the other one of the first program or the second program.

The control device includes programs in different execution formats including the program in the first execution format and the program in the second execution format. In the first execution format, the overall program is executed per execution. In the second execution format, parts of the program are sequentially executed. These programs in different execution formats allow the user to appropriately select one program suitable for control over a control target and thus increase the convenience of the control device. The first processor executes the program in the first execution format per control cycle and calculates the first command value based on the program.

The second processor calculates a second command value based on the program in the second execution format per control cycle in accordance with an intermediate code generated through interpretation by an interpreter. The second processor can also calculate the second command value in response to execution of the program in the first execution format. For example, the second processor allows the user to control the same control target (second control target) with the program in the first execution format or the program in the second execution format. Thus, the control program for a control target can be flexibly designed to increase user convenience. The output unit outputs first and second command values. Thus, the command values based on the programs in different execution formats can be output in synchronization. This structure may cause the same control target to be controlled substantially by the two programs in the first and second execution formats. This may cause overlap between the control times.

In response to overlap between the times to execute the programs, the permitter in the control device permits execution of one program alone based on the state of access to the second processor, or more specifically, permits one program alone that has accessed earlier to control the control target. Thus, while one program is already being executed, the permitter does not permit execution of another program despite any request for executing another program. In other words, in response to overlap between the times to execute programs on the same control target, the permitter exclusively permits execution of one of the programs based on the state of access to the second processor.

The control device with this structure appropriately prevents a control target from being controlled with different programs at a time. The control device also allows flexible program design for control over the control target to increase user convenience. The control device can thus appropriately control the control target. The system can be built without the user efforts to avoid overlap of control programs during programming. This reduces a load in programming and allows easy building of the system.

In the control device, in response to an end of control over the second control target performed by one of the first program or the second program accessing the second processor earlier than the other one of the first program or the second program, the first program in the first execution format and the second program in the second execution format may become executable upon being permitted by the permitter. Such a control device allows exclusive execution of one of the programs continuously on the same control target.

In the control device, in response to permitting execution of one of the first program or the second program, the permitter may provide an error notification for the other one of the first program or the second program for which execution is not permitted by the permitter. This structure allows the program for which execution is not permitted to perform a predetermined substitute process based on the error notification.

Advantageous Effects

The technique according to the above aspects allows easy building of a system that appropriately controls a control target.

DETAILED DESCRIPTION

Example Use

Figure 1:
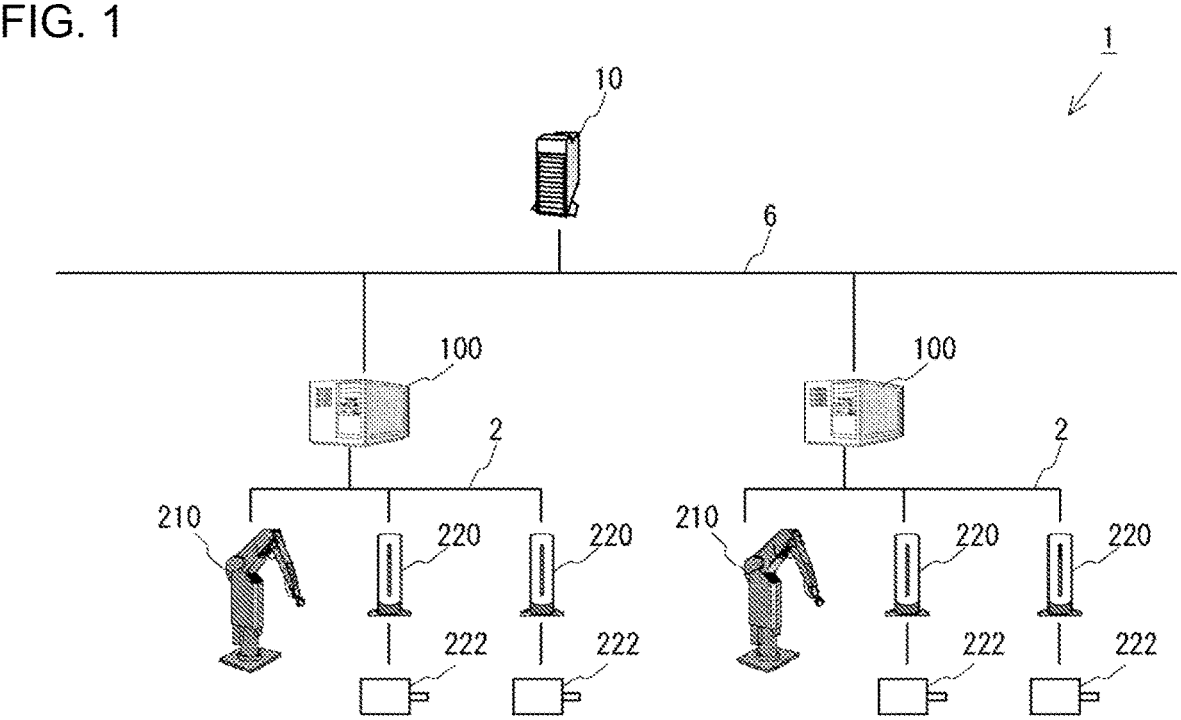
FIG. 1 is a schematic diagram of a control system including an integrated controller.
Figure 2:
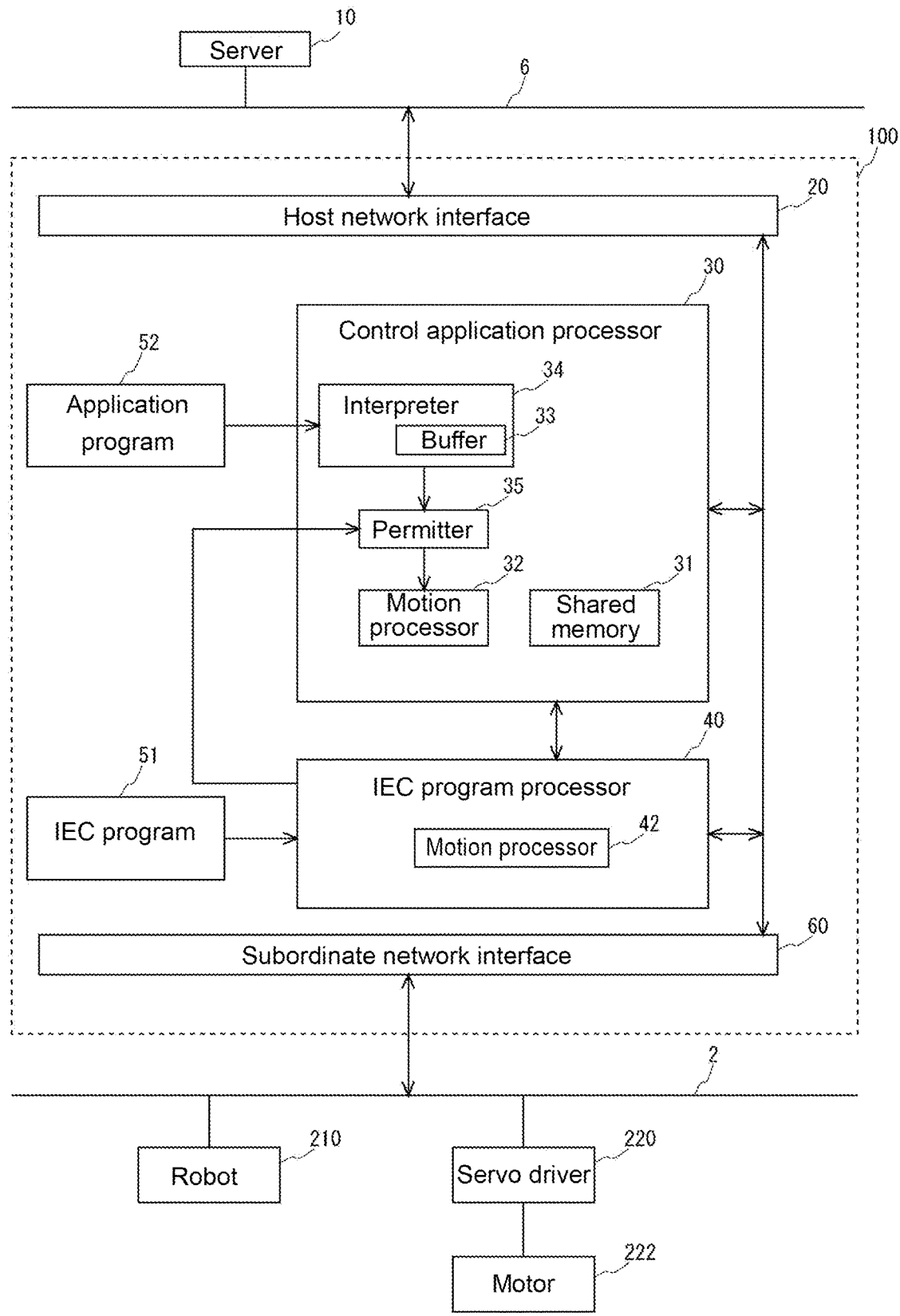
FIG. 2 is a functional block diagram of the integrated controller, describing its functions.

An example use of a control device according to an embodiment will now be described with reference to FIGS. 1 and 2. FIG. 1 is a schematic diagram of a control system 1 including control devices 100. FIG. 2 is a functional block diagram of each control device 100, describing its functions.

Each control device 100 corresponds to an industrial controller that controls a control target including various facilities or devices. The control device 100 is a computer that performs control computations described later. The control device 100 may be connected to various field devices through a field network 2. The field devices include an actuator that physically acts on a production device or a production line (hereafter collectively referred to as a field) and an input-output device that exchanges information with the field. In the example shown in FIG. 1, the field devices include robots 210, servo drivers 220, and motors 222. Each servo driver 220 drives the corresponding motor 222 in accordance with output data (for example, position commands or speed commands) from the corresponding control device 100. Examples of the robot 210 include a parallel robot, a selective compliance assembly robot arm (SCARA) robot, and an articulated robot. The control device 100 can thus integrally control the robots 210, the servo drivers 220, and the motors 222. The control device 100 will be described in detail below.

The control device 100 exchanges data with one or more field devices through, for example, the field network 2. The field network is generally referred to as a field bus, but is referred to as a field network herein for simplicity of explanation. The control device 100 collects data (hereafter referred to as input data) collected or generated by various field devices (input process), generates data (hereafter referred to as output data) including commands to the field devices (computation process), and transmits the generated output data to the corresponding field devices (output process).

The field network 2 may be a bus or a network that allows pre-timed communications for guaranteed data arrival time. For example, EtherCAT (registered trademark) is known as an example of such a bus or network that allows pre-timed communications. Data exchanged between the control device 100 and a field device through the field network 2 is updated in very short cycles of the order of several hundred microseconds to several ten milliseconds. Such update of exchanged data is also referred to as an input-output refresh.

The control device 100 is also connected to another device through a host network 6. The host network 6 may be Ethernet (registered trademark) or EtherNet/IP (registered trademark), which is a typical network protocol. More specifically, one or more servers 10 may be connected to the host network 6. Examples of the servers 10 include a database system and a manufacturing execution system (MES). The MES obtains information from a production device or a facility as a control target to monitor and manage the entire production. The MES can also handle information such as order information, quality information, or shipping information. Instead of a server, a device that provides information services may be connected to the host network 6.

Referring now to FIG. 2, the structure of each control device 100 will be described. The control device 100 is a computer that performs predetermined control computations as described above, and includes a processor and a memory for the control computations. The processor includes a central processing unit (CPU), a micro processing unit (MPU), and a graphics processing unit (GPU). The processor may include multiple cores, or the computer may include multiple processors. Examples of the memory include a volatile storage such as a dynamic random access memory (DRAM) or a static random access memory (SRAM) and a nonvolatile storage such as a hard disk drive (HDD) or a solid state drive (SSD). The processor reads various programs from the memory and executes the programs to perform appropriate control or various other processes (described later) on a control target. In addition to the system program for implementing basic functions, the memory stores user programs (an IEC program 51 and an application program 52) designed in accordance with a production device or a facility as a control target.

In one or more embodiments of the present disclosure, the overall IEC program 51 is scanned per execution for calculating one or more command values per execution. The IEC program 51 typically contains a program including one or more commands described in accordance with the international standard IEC61131-3 defined by the International Electrotechnical Commission (IEC). The IEC program 51 contains commands for sequence control and motion control. The IEC program 51 is in an execution format in which the overall program is executed (scanned) per control cycle, and is suitable for instantaneous and speedy control. The application program 52 in one or more embodiments of the present disclosure is a control program for performing specific processing or a specific operation with a robot, and contains a program including one or more commands for implementing a control application with the robot. The application program 52 is basically distinguished from the IEC program 51. In one example, the application program 52 for robot control is an interpreter described in a robot language executed sequentially line by line.

As shown in FIG. 2, the control device 100 includes an IEC program processor 40, a subordinate network interface 60, a host network interface 20, and a control application processor 30. The subordinate network interface 60 mediates, through the field network 2, data exchange between the IEC program processor 40 and the connected field devices and between the control application processor 30 and the field devices. The host network interface 20 mediates, through the host network 6, data exchange between the IEC program processor 40 and the connected the server 10 and between the control application processor 30 and the server 10. For example, the control device 100 receives a command such as a production start or a production end from the server 10 connected through the host network 6. The server 10 may transmit information such as recipe information (information including parameters appropriate for production) and an application program for running the control application to the control device 100.

The IEC program processor 40 executes (scans) the IEC program 51 per predetermined control cycle and calculates one or more command values. More specifically, the IEC program processor 40 calculates command values per control cycle in accordance with the IEC program 51. In one or more embodiments of the present disclosure, the IEC program 51 is executed to control a predetermined device including the motor 222. A motion processor 42 calculates command values per control cycle in accordance with a motion command contained in the IEC program 51. More specifically, the motion command contained in the IEC program 51 includes a command indicating the behavior over multiple control cycles (for example, a command instructing a predetermined device including the motor 222 to have an output for drawing a certain locus). When the motion command is executed, the motion processor 42 calculates command values per control cycle in accordance with the instruction in the executed motion command. In other words, the motion processor 42 outputs command values per control cycle to the predetermined device to implement the behavior instructed by the motion command.

The control application processor 30 calculates command values for controlling the control application based on, for example, the application program 52 and the recipe information. In one or more embodiments of the present disclosure, the control application processor 30 executes the application program 52 to control the robot 210. The control application processor 30 calculates and outputs command values for the control application in synchronization with the IEC program processor 40 calculating and outputting the command values. In other words, the control application processor 30 calculates the command values in synchronization with the IEC program processor 40. The synchronous processes of the IEC program processor 40 and the control application processor 30 will be described later. To calculate the command values in synchronization with the IEC program processor 40, the control application processor 30 includes a motion processor 32, a buffer 33, and an interpreter 34.

The interpreter 34 sequentially interprets at least a part of the application program 52, and generates an intermediate code. The interpreter 34 includes the buffer 33 to store the generated intermediate code. In one or more embodiments of the present disclosure, the intermediate code contains a command for calculating command values per control cycle, and may contain one or more commands or one or more functions. The motion processor 32 calculates command values per control cycle in accordance with intermediate codes pre-generated by the interpreter 34 and stored in the buffer 33. Typically, commands (codes) described in the application program 52 are executed sequentially. Thus, the calculation cycle of command values is not guaranteed. However, in one or more embodiments of the present disclosure, the use of the intermediate codes allows the motion processor 32 to calculate command values per control cycle. Commands described in the intermediate codes may include a coordinate system corresponding to each control application.

A shared memory 31 allows data sharing between the IEC program processor 40 and the control application processor 30. In one or more embodiments of the present disclosure, the shared memory 31 stores a part or all of the results of the processing performed by the control application processor 30. The IEC program processor 40 can access data stored in the shared memory 31 in the control application processor 30. The IEC program processor 40 may write data into the shared memory 31 in the control application processor 30. Such data written by the IEC program processor 40 is accessible by the interpreter 34 and the motion processor 32.

As described above, the motion processor 32 controls the robot 210 with the intermediate codes generated by the interpreter 34. In another example, the motion processor 32 may control the robot 210 in response to execution of the IEC program 51. In this case, the IEC program 51 contains a control command (motion command) for the robot 210. Upon the IEC program processor 40 executing the IEC program 51, the control command for the robot 210 contained in the IEC program 51 is provided to the motion processor 32. The motion processor 32 controls the robot 210 based on the control command.

The control device 100 thus controls the robot 210 in accordance with both the IEC program 51 and the application program 52 in different execution formats. Thus, the control system 1 for implementing a user request can be flexibly built based on the characteristics of each program. In this structure, the robot 210 can be controlled with different programs. This structure can cause overlap between the times to execute the two programs for robot control, thus possibly causing the robot 210 to operate in an unexpected manner. To avoid such an unexpected operation of the robot 210, the user is to appropriately manage the correlation between the times to execute the two programs. This can be a burden on the user.

The control device 100 includes a permitter 35 that permits, in response to overlap between the times to execute the IEC program 51 and the application program 52 for robot control, alternative execution to permit execution of one of the programs without permitting execution of the other program. The permitter 35 in the control device 100 limits the program for controlling the robot 210 to either the IEC program 51 or the application program 52. This structure can avoid the robot 210 operating unintentionally in response to overlap between the times to execute the IEC program 51 and the application program 52.

Synchronous Execution of Programs

The control device 100 implements synchronous execution of the IEC program 51 and the application program 52. The interpreter 34 in the control application processor 30 sequentially executes parts of the application program 52 per cycle longer than the control cycle, for example, per cycle twice as long as the control cycle. The motion processor 42 in the IEC program processor 40 and the motion processor 32 in the control application processor 30 calculate command values per same control cycle. Thus, command values are output from the control device 100 in synchronization in the predetermined control cycle. As described above, the IEC program processor 40 and the control application processor 30 each include a motion processor for continuously controlling the movement of the actuator. These motion processors calculate command values in synchronization. This allows the control in accordance with the IEC program 51 and the control in accordance with the application program 52 to be performed in synchronization with the control cycle. Thus, precise control per control cycle can be performed.

Figure 3:
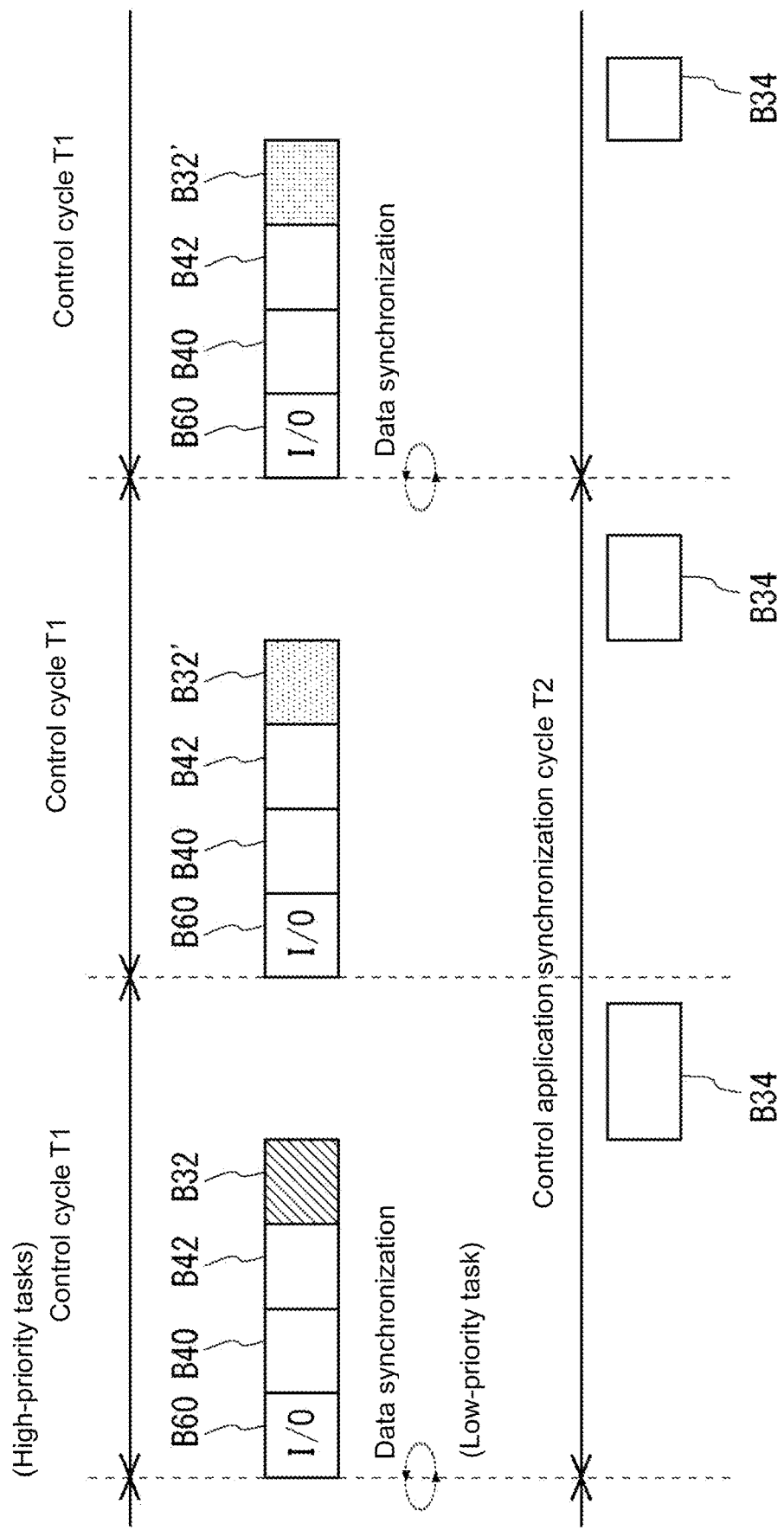
FIG. 3 is a diagram showing a sequence of processing performed by the integrated controller in control cycles.

The times to execute the IEC program 51 and the application program 52 in the control device 100 will now be described in detail with reference to FIG. 3. FIG. 3 is a diagram describing example times to execute the programs in the control device 100. The control device 100 has high-priority tasks (upper process in FIG. 3) with a high priority and a low-priority task (lower process in FIG. 3) with a low priority, which are set based on the processor resource. More specifically, the execution of the subordinate network interface 60, the execution of the IEC program processor 40, the execution of the motion processor 42, and the execution of the motion processor 32 in the control application processor 30 are set as high-priority tasks, and the execution of the interpreter 34 in the control application processor 30 is set as a low-priority task.

More specifically, tasks executed as high-priority tasks include input-output refresh B60 performed by the subordinate network interface 60, execution B40 of the IEC program 51, computation B42 of a command value performed by the motion processor 42 in accordance with the IEC program 51, computation B32 of a command value performed by the motion processor 32 in accordance with the application program 52, and computation B32' of a command value performed by the motion processor 32 in response to execution of the IEC program 51. Sequential interpretation B34 of the application program 52 is executed as a low-priority task. In the high-priority tasks in one control cycle T1, the permitter 35 described above permits execution of either the computation B32 or the computation B32'.

The high-priority tasks are repeatedly executed per predetermined control cycle T1. The low-priority task is executed in each control cycle while the high-priority tasks are not being executed. More specifically, the time to execute the high-priority tasks is allocated to each control cycle, and the low-priority task is executed at a time other than the time to execute the high-priority tasks.

The high-priority tasks will first be described. In each control cycle, the input-output refresh B60 is executed, and then the IEC program processor 40 executes (scans) the overall IEC program 51 to calculate one or more command values for sequence control (execution B40). The motion processor 42 performs a motion process for the motion command contained in the IEC program 51 to calculate one or more command values of the motion command (execution B42). The motion processor 32 in the control application processor 30 prepares a motion command for controlling the robot 210 in accordance with the intermediate code stored in the buffer 33 (execution B32), or prepares a motion command for controlling the robot 210 included in the IEC program 51 (execution B32'). The permission from the permitter 35 determines whether to perform the execution B32 or the execution B32'. The permission process will be described in detail later. The same processes are repeated per control cycle. The motion processor 32 may read an intermediate code from the buffer 33 at the time other than every control cycle. The read intermediate code may include commands for calculating command values over multiple control cycles T1. In this case, the intermediate code can be read at a time over the multiple control cycles T1.

In this manner, the high-priority tasks in a control cycle are executed to generate a set of command values. The command values include a command value for the sequence control over, for example, the motor 222, a command value for the motion control over, for example, the motor 222, and a command value for the control application of the robot 210. These command values are basically reflected on the field in the subsequent control cycle. In other words, the IEC program processor 40 and the control application processor 30 calculate command values corresponding to input data in the same control cycle, and can thus provide outputs synchronized with the inputs.

For the low-priority task, the interpreter 34 in the control application processor 30 sequentially executes parts of the application program 52. More specifically, the interpreter 34 reads and analyzes the application program 52 with a low priority. The intermediate codes generated by the interpreter 34 analyzing the application program 52 are sequentially stored in the buffer 33 based on the capacity of the buffer 33. The intermediate codes stored in the buffer 33 are sequentially referred to by the motion processor 32 in the control application processor 30, and used to generate command values in the computation B32. In this case, the interpreter 34 pre-generates extra intermediate codes corresponding to an integral multiple of the control cycle as the computation cycle of the high-priority tasks, and thus can calculate the command values for the control application per control cycle without affecting the process performed by the motion processor 32.

Before each predetermined control application synchronization cycle (integral multiple of the control cycle), the interpreter 34 temporarily stops interpretation of the application program 52. At the time of temporary stop, the IEC program processor 40 and the control application processor 30 perform data synchronization with each other to share data consistent for the two processors. The interpreter 34 thus updates data shared with the IEC program processor 40 per synchronization cycle. In addition to updating shared data, the interpreter 34 may also update (synchronize) input data and output data obtained from the field. This allows the control application processor 30 to control the robot 210 using data obtained by the IEC program processor 40. The control application synchronization cycle may have any length corresponding to an integral multiple of the control cycle. The control application synchronization cycle is appropriately set in accordance with, for example, the precision of control intended in the control application.

Figure 4:
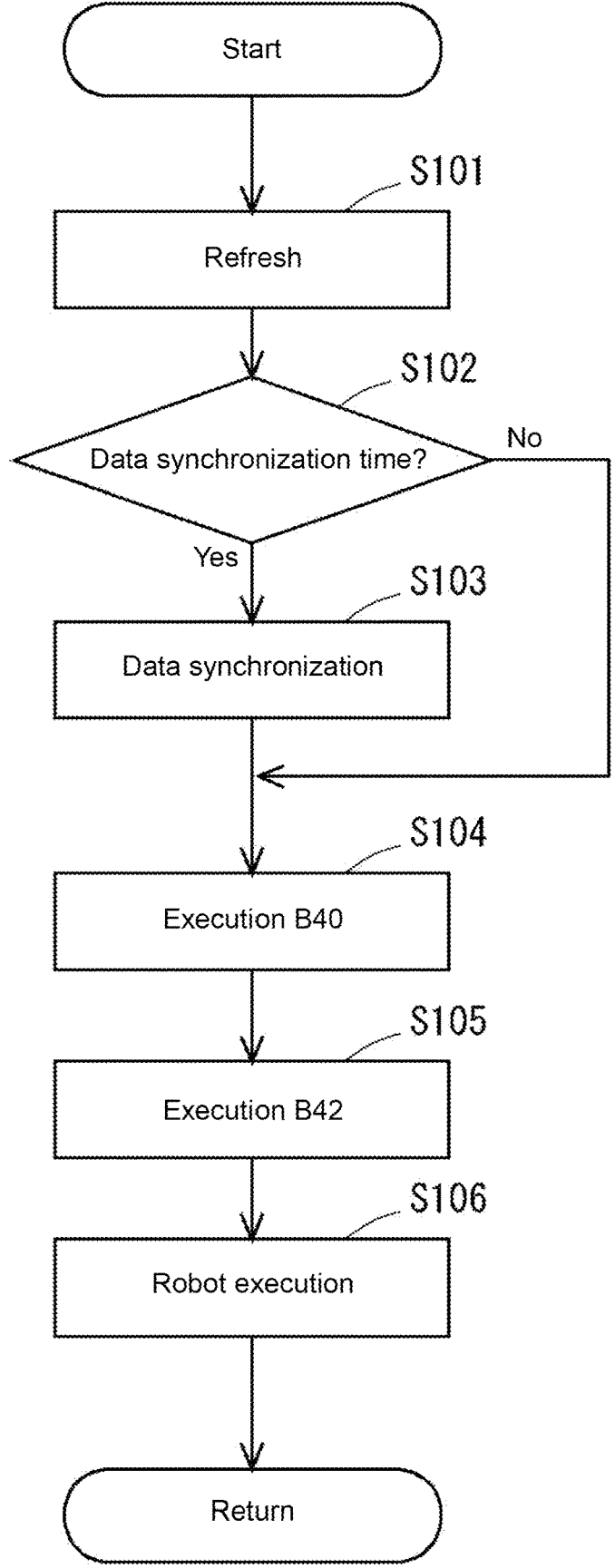
FIG. 4 is a flowchart of first robot control performed by the integrated controller.
Figure 5:
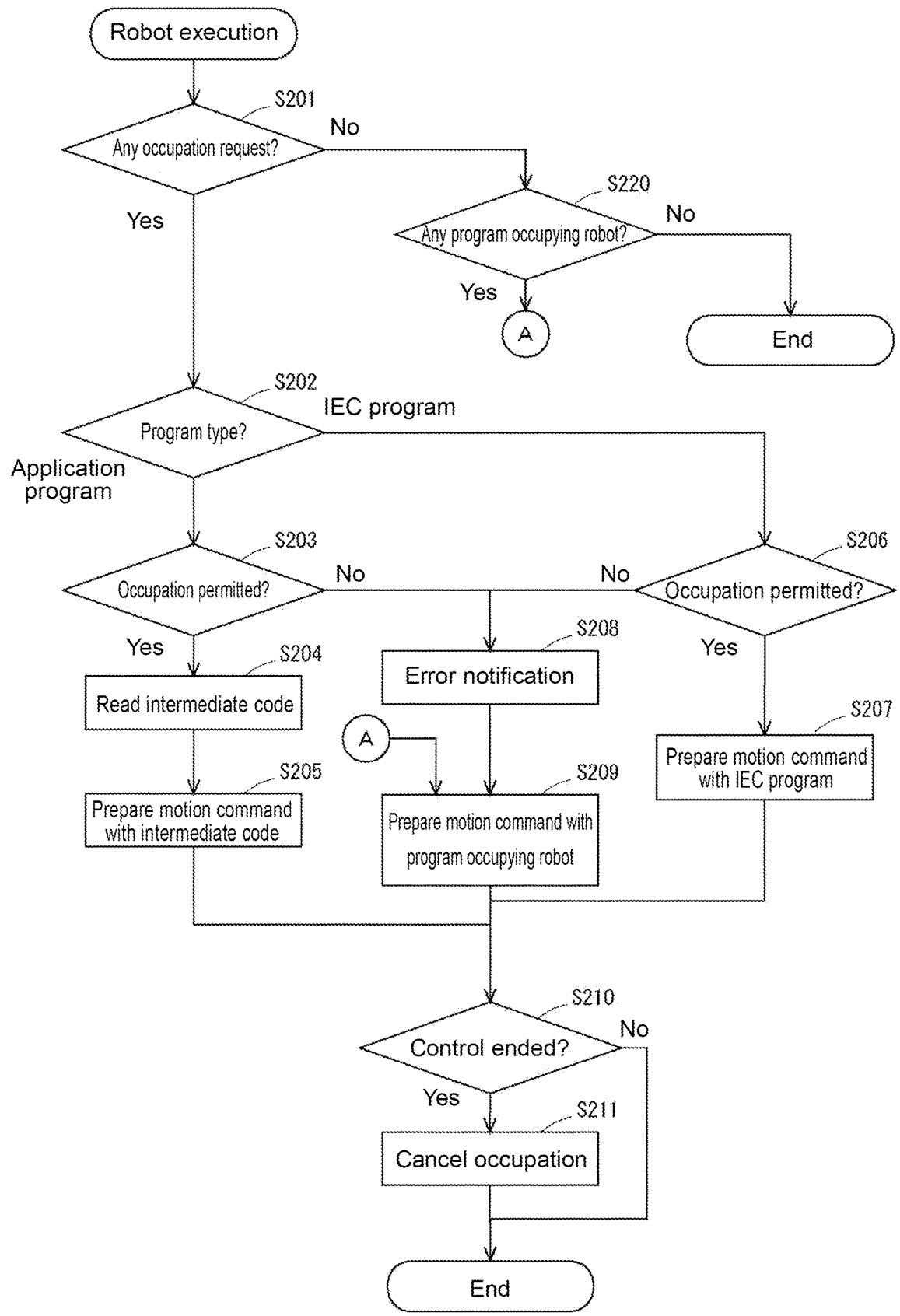
FIG. 5 is a flowchart of second robot control performed by the integrated controller.
Figure 6:
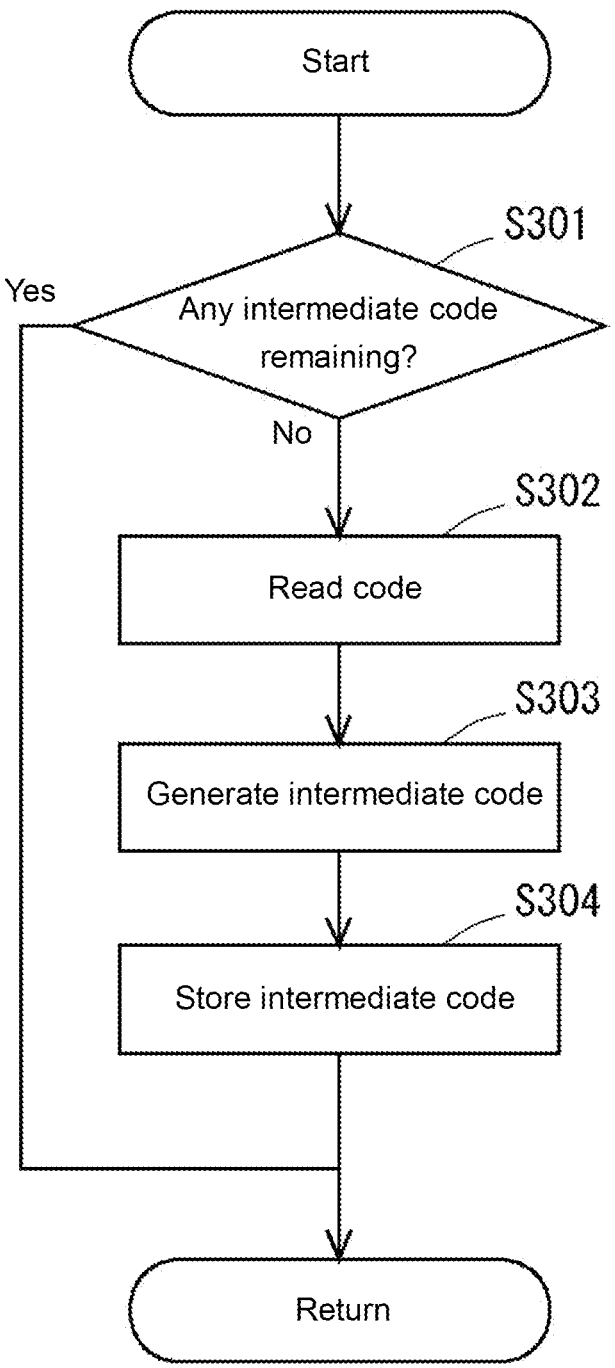
FIG. 6 is a flowchart of third robot control performed by the integrated controller.

The process performed on the field devices (the robot 210 and the motor 222) as controlled by the control device 100 will now be described with reference to FIGS. 4 to 6. FIG. 4 is a flowchart of the process for the above high-priority tasks, FIG. 5 is a flowchart of a detailed robot execution performed for the high-priority tasks, and FIG. 6 is a flowchart of the process for the low-priority task described above.

The process for the high-priority tasks will first be described. In each control cycle T1, the subordinate network interface 60 performs the input-output refresh (process in S101). This process allows output of the command values (command values from, for example, the processes B40, B42, and B32 or B32') calculated in the previous control cycle T1 to, for example, the actuator in each field device and input of data from each field device. Subsequently, in S102, the determination is performed as to whether the current control cycle matches the data synchronization time. In response to an affirmative determination result obtained in S102, data synchronization is performed between the IEC program processor 40 and the control application processor 30 (process in S103). In response to a negative determination result obtained in S102, the processing advances to S104.

The execution B40 is performed in S104, and then the execution B42 is performed in S105. After S105, the robot execution is performed in S106 for preparing a motion command for controlling the robot 210.

The robot execution will now be described with reference to FIG. 5. In S201, the determination is performed as to whether any occupation request is issued as a request for occupying the robot 210 in the period of controlling the robot 210. The occupation request is issued to the control application processor 30 from the IEC program 51 and the application program 52 containing control commands to instruct the robot 210 to perform a predetermined series of control operations before the instructed control is started. In response to the issued occupation request being permitted in occupation permission determination in S203 or S206 described later, the robot 210 is occupied by either program for control until the occupation is canceled in S211 (described later). In response to an affirmative determination result obtained in S201, the processing advances to S202. In response to a negative determination result obtained in S201, the processing advances to S220.

In S202, the determination is performed as to whether the application program 52 or the IEC program 51 has issued the occupation request. In response to the request issued from the application program 52, the processing advances to S203. In response to the request issued from the IEC program 51, the processing advances to S206. In S203, the determination is performed as to whether the occupation request issued by the application program 52 is to be permitted by the permitter 35. In this determination, unless the robot 210 is occupied by the other program or the IEC program 51 for control, the occupation request issued by the application program 52 is permitted (the determination result is affirmative in S203). In response to the robot 210 being occupied by the IEC program 51 for control, the occupation request is not permitted (the determination result is negative in S203). In response to an affirmative determination result obtained in S203, the processing advances to S204. In response to a negative determination result obtained in S203, the processing advances to S208.

In S204, the motion processor 32 reads the intermediate code from the buffer 33. In the subsequent step S205, the motion processor 32 calculates a motion command for controlling the robot 210 in the current control cycle T1 in accordance with the read intermediate code. The motion command is prepared for synchronous control (processing corresponding to the computation B32).

In S206, the determination is performed as to whether the occupation request issued by the IEC program 51 is permitted by the permitter 35. In this determination, unless the robot 210 is occupied by the other program or the application program 52 for control, the occupation request issued by the IEC program 51 is permitted (the determination result is affirmative in S206). In response to the robot 210 being occupied by the application program 52 for control, the occupation request is not permitted (the determination result is negative in S206). In response to an affirmative determination result obtained in S206, the processing advances to S207. In response to a negative determination result obtained in S206, the processing advances to S208.

In S207, the motion command included in the IEC program 51 for controlling the robot 210 is prepared for synchronous control (processing corresponding to the computation B32').

In response to a negative determination result obtained in S203 or S206, the processing advances to S208, in which the permitter 35 provides an error notification. The error notification indicates that the occupation request output from one program is not permitted while the robot 210 is being occupied by the other program for control. Subsequently, in S209, a motion command for controlling the robot 210 is prepared for synchronous control in accordance with the program currently occupying the robot 210. More specifically, in response to the robot 210 being occupied by the application program 52, processing corresponding to the processing in S204 and S205 is performed. In response to the robot 210 being occupied by the IEC program 51, processing corresponding to the processing in S207 is performed.

After S205, S207, or S209, the processing advances to S210. In S210, the determination is performed as to whether the series of control operations on the robot 210 in accordance with the corresponding program is ended. The control is determined to be ended or not ended based on, for example, a control end command output from each program. In response to an affirmative determination result obtained in S210, the robot 210 is released from being occupied in the subsequent step S211. After S211, the robot 210 is unoccupied by any of the programs for control. In response to a negative determination result obtained in S210, the robot 210 remains occupied.

In response to a negative determination result obtained in S201, the processing advances to S220. In S220, in response to no occupation request being issued (the determination result is negative in S201), the determination is performed as to whether the robot 210 is occupied by any program for control. In response to an affirmative determination result obtained in S220, the processing advances to S209. A motion command for controlling the robot 210 is prepared for synchronous control in accordance with the program currently occupying the robot 210. In response to a negative determination result obtained in S220, the robot execution ends. In this case, no motion command is prepared for controlling the robot 210.

The command value calculated and prepared in the series of processes of the high-priority tasks shown in FIGS. 4 and 5 is output to the field in the subsequent control cycle T1. After the series of processes and before the subsequent control cycle T1, the low-priority task is performed as shown in FIG. 6.

The process of the low-priority task will now be described with reference to FIG. 6. The low-priority task is performed for the interpreter 34 to interpret the application program 52. In S301, the control application processor 30 determines whether any intermediate code remains in the buffer 33 to avoid generation of intermediate codes exceeding the capacity of the buffer 33. In response to an affirmative determination result obtained in S301, the low-priority task ends. In response to a negative determination result obtained in S301, the processing advances to S302. In S302, the interpreter 34 reads a part of the application program 52. For example, the interpreter 34 reads a line of the code included in the application program 52. In S303, the interpreter 34 interprets the read code to generate an intermediate code. The generated intermediate code is stored in the buffer 33 in S304. In response to no application program being available for execution, the processing in S302 to S304 is not performed, and thus no intermediate code is stored in the buffer 33. The low-priority task undergoing the above series of processes is repeated during a period allocated to the low-priority task to execute the program.

The series of processes in FIGS. 4 to 6 allows the IEC program 51 and the application program 52 to be executed in the control device 100 at the execution times shown in FIG. 3. In particular, the motion processor 32 performs exclusive motion control over the robot 210 through a permission process performed by the permitter 35 based on either the IEC program 51 or the application program 52. This structure allows the user to build the control system 1 while relying on the permission process performed by the permitter 35 to achieve motion control over the robot 210. The user can thus easily build the control system 1 that can appropriately control the robot 210.

APPENDIX 1

A control device (100) including a first program (51) in a first execution format in which an overall program is executed per execution, and a second program (52) in a second execution format in which parts of the second program (52) are sequentially executed, the device (100) comprising:

a first processor (40) configured to execute the first program (51) in the first execution format per predetermined control cycle to calculate a first command value for controlling a first control target (222);

a second processor (30) configured to execute the second program (52) in the second execution format to calculate a second command value for controlling a second control target (210) per predetermined control cycle in accordance with an intermediate code generated by an interpreter (34) interpreting at least a part of the second program in the second execution format, and to calculate the second command value for controlling the second control target (210) in response to the first processor (40) executing the first program (51) in the first execution format;

an output unit (60) configured to output the first command value and the second command value per predetermined control cycle; and a permitter (35) configured to permit, in response to overlap between a time to execute the first program (51) in the first execution format and a time to execute the second program (52) in the second execution format for controlling the second control target (210), execution of one of the first program (51) or the second program (52) accessing the second processor (30) earlier than the other one of the first program (51) or the second program (52).

REFERENCE SIGNS LIST 1 control system
2 field network
6 host network
10 server
30 control application processor
40 IEC program processor
51 IEC program
52 application program
210 robot
220 servo driver
222 motor

The invention claimed is:

1. A control device including a first program in a first execution format in which an entirety of the first program is executed per a predetermined control cycle, and a second program in a second execution format in which parts of the second program are sequentially executed by an interpreter, the device comprising:

a first processor configured to execute the first program in the first execution format per the predetermined control cycle (i) to calculate a first command value for controlling a first control target and (ii) to control a second control target;

a second processor configured to execute the second program in the second execution format to calculate a second command value for controlling the second control target per the predetermined control cycle in accordance with an intermediate code generated by the interpreter interpreting at least a part of the second program in the second execution format, and to calculate the second command value for controlling the second control target in response to the first processor executing the first program in the first execution format; and an interface configured to output the first command value and the second command value per the predetermined control cycle, wherein the second processor is configured to permit, in response to an overlap between a time to execute the first program in the first execution format and a time to execute the second program in the second execution format for controlling the second control target, execution of one of the first program or the second program that issued an occupation request to the second processor earlier than the other one of the first program or the second program per the predetermined control cycle.

2. The control device according to claim 1, wherein in response to an end of control over the second control target performed by one of the first program or the second program that issued the occupation request to the second processor earlier than the other one of the first program or the second program, the first program in the first execution format and the second program in the second execution format become executable upon being permitted by the second processor.

3. The control device according to claim 1, wherein
in response to permitting execution of one of the first program or the second program, the second processor provides an error notification for the other one of the first program or the second program for which execution is not permitted by the second processor.

4. The control device according to claim 2, wherein
in response to permitting execution of one of the first program or the second program, the second processor provides an error notification for the other one of the first program or the second program for which execution is not permitted by the second processor.

* * * * *